United States Patent
Kunisada

(10) Patent No.: US 12,286,379 B2
(45) Date of Patent: Apr. 29, 2025

(54) ZIRCONIA POWDER, METHOD FOR PRODUCING ZIRCONIA POWDER, METHOD FOR PRODUCING ZIRCONIA SINTERED BODY, AND ZIRCONIA SINTERED BODY

(71) Applicant: DAIICHI KIGENSO KAGAKU KOGYO CO., LTD., Osaka (JP)

(72) Inventor: Taichi Kunisada, Osaka (JP)

(73) Assignee: DAIICHI KIGENSO KAGAKU KOGYO CO., LTD., Osaka (JP)

( * ) Notice: Subject to any disclaimer, the term of this patent is extended or adjusted under 35 U.S.C. 154(b) by 960 days.

(21) Appl. No.: 17/420,302

(22) PCT Filed: Mar. 25, 2020

(86) PCT No.: PCT/JP2020/013409
§ 371 (c)(1),
(2) Date: Jul. 1, 2021

(87) PCT Pub. No.: WO2020/196650
PCT Pub. Date: Oct. 1, 2020

(65) Prior Publication Data
US 2022/0089500 A1    Mar. 24, 2022

(30) Foreign Application Priority Data
Mar. 25, 2019 (JP) ................... 2019-057083

(51) Int. Cl.
*C04B 35/48* (2006.01)
*C04B 35/64* (2006.01)

(52) U.S. Cl.
CPC .............. *C04B 35/48* (2013.01); *C04B 35/64* (2013.01); *C04B 2235/3217* (2013.01); *C04B 2235/3232* (2013.01); *C04B 2235/3241* (2013.01); *C04B 2235/3246* (2013.01); *C04B 2235/3267* (2013.01); *C04B 2235/3272* (2013.01); *C04B 2235/3275* (2013.01); *C04B 2235/3284* (2013.01); *C04B 2235/5409* (2013.01); *C04B 2235/604* (2013.01); *C04B 2235/6567* (2013.01); *C04B 2235/762* (2013.01); *C04B 2235/765* (2013.01); *C04B 2235/9661* (2013.01)

(58) Field of Classification Search
CPC .............................. C04B 35/48–499
See application file for complete search history.

(56) References Cited

U.S. PATENT DOCUMENTS

| | | | |
|---|---|---|---|
| 4,626,517 A | 12/1986 | Watanabe et al. | |
| 4,748,138 A | 5/1988 | Watanabe et al. | |
| 5,263,858 A * | 11/1993 | Yoshida ................ | C04B 35/486 433/8 |
| 2010/0003630 A1 | 1/2010 | Yamashita et al. | |
| 2011/0027742 A1 | 2/2011 | Fujisaki et al. | |
| 2014/0227654 A1 | 8/2014 | Fujisaki et al. | |
| 2018/0282225 A1 | 10/2018 | Takai | |

FOREIGN PATENT DOCUMENTS

| | | | | |
|---|---|---|---|---|
| CN | 103382112 A | 11/2013 | | |
| CN | 103732559 A | 4/2014 | | |
| CN | 105669191 A | 6/2016 | | |
| EP | 0700880 A2 * | 9/1995 | | |
| EP | 2746242 A1 * | 6/2014 | ............. | C04B 35/48 |
| EP | 3 345 870 A1 | 7/2018 | | |
| JP | S59-182270 A | 10/1984 | | |
| JP | H8-117248 A | 5/1996 | | |
| JP | 2003212546 A * | 7/2003 | | |
| JP | 2004-75425 A | 3/2004 | | |
| JP | 2008-50247 A | 3/2008 | | |
| JP | 4253877 B2 | 4/2009 | | |
| JP | 2014-88319 A | 5/2014 | | |
| JP | 2018-172263 A | 11/2018 | | |
| WO | 2017170565 A1 | 10/2017 | | |

OTHER PUBLICATIONS

An Office Action; "Decision of Rejection", mailed by China National Intellectual Property Administration on Aug. 31, 2023, which corresponds to Chinese Patent Application No. 202080023846.0 and is related to U.S. Appl. No. 17/420,302; with English language translation.

The extended European search report issued by the European Patent Office on Jul. 13, 2022, which corresponds to European Patent Application No. 20776913.4-1108 and is related to U.S. Appl. No. 17/420,302.

An Office Action mailed by China National Intellectual Property Administration on Apr. 21, 2023, which corresponds to Chinese Patent Application No. 202080023846.0 and is related to U.S. Appl. No. 17/420,302; with English language translation.

International Search Report issued in PCT/JP2020/013409; mailed Jun. 23, 2020.

An Office Action; "Notice of Reasons for Refusal", mailed by the Japanese Patent Office on Feb. 15, 2022, which corresponds to Japanese Patent Application No. 2021-509525 and is related to U.S. Appl. No. 17/420,302; with English language translation.

An Office Action mailed by China National Intellectual Property Administration on Nov. 18, 2022, which corresponds to Chinese Patent Application No. 202080023846.0 and is related to U.S. Appl. No. 17/420,302; with English language translation.

(Continued)

*Primary Examiner* — Matthew E. Hoban
(74) *Attorney, Agent, or Firm* — Studebaker Brackett PLLC

(57) ABSTRACT

This zirconia powder contains 2.5 to 3.5 mol % of yttria; has a specific surface area of 5 to 20 $m^2/g$; and has crystal phases that include a monoclinic crystal phase percentage of 20 to 40% and a tetragonal crystal phase percentage of 60 to 80%. When the zirconia powder is molded under a mold pressure of 0.8 $t/cm^2$ and then sintered under a condition of 2 hours at 1450° C. to obtain a sintered body, the sintered body has crystal phases that include a monoclinic crystal phase percentage of 1 to 3%, a tetragonal crystal phase percentage of 77 to 94%, and a cubic crystal phase percentage of 5 to 20%.

21 Claims, No Drawings

(56) References Cited

OTHER PUBLICATIONS

Notification of Transmittal of Translation of the International Preliminary Report on Patentability and Translation of Written Opinion of the International Searching Authority; PCT/JP2020/013409; mailed on Oct. 7, 2021.

* cited by examiner

ZIRCONIA POWDER, METHOD FOR PRODUCING ZIRCONIA POWDER, METHOD FOR PRODUCING ZIRCONIA SINTERED BODY, AND ZIRCONIA SINTERED BODY

TECHNICAL FIELD

The present invention relates to a zirconia powder, a method for producing a zirconia powder, a method for producing a zirconia sintered body, and a zirconia sintered body.

BACKGROUND ART

Zirconia (zirconium oxide) is used for a very wide range of applications. Typical examples of such zirconia include a powder produced by a drying method or a powder produced by a wetting method. Recently, research and development have been actively conducted on a zirconia powder produced by a wetting method because of its multifunctionality (hereinafter, referred to as "wet zirconia powder"). For example, a wet zirconia powder produced by a wetting purification method such as a hydrolysis method is used for electronic materials, co-catalysts for purifying automobile exhaust gas, oxygen sensors, fine ceramics, antireflection films, and electrolytes of solid oxide fuel cells, and the like.

The wet zirconia powder may be used as a powder base, but the wet zirconia is often used as a sintered body to exhibit its function. The zirconia sintered body is produced by molding the zirconia powder, and then sintering the molded body. In this case, the zirconia powder is previously subjected to a stabilizing treatment in order to maintain a tetragonal or cubic crystal structure, which is a high-temperature stable phase of zirconia crystal, to ordinary temperature. The stabilizing treatment of the zirconia crystal is generally performed by dissolving oxides such as calcia, magnesia, and yttria in zirconia. A sintered body composed of zirconia having only a cubic crystal structure is widely used as a so-called fully stabilized zirconia (generally referred to as "stabilized zirconia") sintered body. A sintered body containing zirconia having a tetragonal crystal structure is widely used as a partially stabilized zirconia sintered body.

The strength increase of the zirconia sintered body has been conventionally studied. The mechanism of the strength increase of the zirconia sintered body is based on the martensitic phase transition of a tetragonal crystal phase zirconia contained in the sintered body to a monoclinic crystal phase by stress. In pressureless sintering that is a general method for producing a zirconia sintered body, large pores remain in the sintered body. The breaking strength of the sintered body is influenced by the size of the large pores. The sintered body obtained by pressureless sintering and containing the large pores remaining therein has three-point bending strength of about 1000 to 1100 MPa.

Patent Document 1 discloses an orthodontic bracket composed of a partially stabilized zirconia sintered body. The partially stabilized zirconia sintered body does not substantially contain zirconia having a cubic crystal structure, and contains 95.5 mol % or more and 99, or less of zirconia having a tetragonal crystal structure. Patent Document 1 discloses that the orthodontic bracket has not only high initial strength and toughness and excellent aesthetic properties but also highly stable mechanical properties when practically used for a long period of time in an actual orthodontic treatment as its affect, whereby an excellent therapeutic effect and aesthetic properties during the treatment can be achieved.

Patent Document 2 discloses a high-strength yttria-containing zirconia sintered body. The sintered body is composed of zirconia containing 2 to 4 mol % of yttria, and has three-point bending strength of 1700 MPa or more and a total light transmittance of 43% or more at a thickness of 0.5 mm. The sintered body has average three-point bending strength of 1900 MPa or more and a total light transmittance of 45% or more at a thickness of 0.5 mm. Patent Document 2 discloses that a zirconia powder containing yttria is molded and sintered in a pressureless state, followed by treating the sintered body under high-temperature and high-pressure conditions by hot isostatic press (HIP).

Patent Document 3 discloses that a translucent zirconia sintered body obtained from a translucent zirconia sintered body powder containing 2 to 4 mol % of yttria as a stabilizer and 0.1 to 0.2% by weight of alumina as an additive has three-point bending strength of 1200 MPa or more. Patent Document 3 discloses that zirconia granules are press-molded by CIP (pressure: 2 t/cm$^2$) and sintered under a condition of 1450° C.

PRIOR ART DOCUMENTS

Patent Documents

Patent Document 1: JP-A-08-117248
Patent Document 2: JP-A-2008-50247
Patent Document 3: JP-A-2014-88319

DISCLOSURE OF THE INVENTION

Problems to be Solved by the Invention

Conventionally, zirconia powders having various compositions and properties have been disclosed (for example, Patent Documents 1 to 3). For molding a zirconia powder to obtain a zirconia sintered body, HIP sintering that has a high cost and a high process load, or the like is generally used, or for even a zirconia powder that does not require the HIP sintering, a mold pressure of about 2 t/cm$^2$ is required. In any case, the process load is high. However, reduction in a mold pressure for obtaining a zirconia sintered body has not been studied in detail as an example.

Meanwhile, as a result of diligent studies, the present inventor has come to the conclusion that if a zirconia sintered body having high strength can be easily produced at a low mold pressure, the process load is usefully low.

The present invention has been made in view of the above-mentioned problems, and an object of the present invention is to provide a zirconia powder capable of easily producing a zirconia sintered body having high strength at a low mold pressure. Another object of the present invention is to provide a method for producing the zirconia powder. Another object of the present invention is to provide a method for producing a zirconia sintered body using the zirconia powder. Another object of the present invention is to provide a zirconia sintered body having high strength.

Means for Solving the Problems

The present inventor has diligently studied a zirconia powder. As a result, the present inventor has found that a zirconia powder capable of easily producing a zirconia sintered body having high strength at a low mold pressure can be provided by adopting the following configuration, and has completed the present invention.

That is, a zirconia powder according to the present invention contains 2.5 mol % or more and 3.5 mol % or less of yttria, wherein: the zirconia powder has a specific surface area of 5 m²/g or more and 20 m²/g or less, and includes crystal phases that have a monoclinic crystal phase ratio of 20% or more and 40% or less and a tetragonal crystal phase ratio of 60% or more and 80% or less; and when the zirconia powder is molded at a mold pressure of 0.8 t/cm² and then sintered under a condition of 2 hours at 1450° C. to obtain a sintered body, the sintered body includes crystal phases that have a monoclinic crystal phase ratio of 1% or more and 3% or less, a tetragonal crystal phase ratio of 77% or more and 94% or less, and a cubic crystal phase ratio of 5% or more and 20% or less.

The dispersed state of yttria is set to a specific state satisfying the above to control the crystal phases, which makes it possible to provide the zirconia powder that can provide a zirconia sintered body having high strength equivalent to that of a conventional product even if the mold pressure is low. This is also clear from Examples. The mold pressure may be low, whereby the use of the zirconia powder facilitates the mass production of the zirconia sintered body.

In the above configuration, it is preferable that when the zirconia powder is molded at a mold pressure of 0.8 t/cm² and then sintered under a condition of 2 hours at 1450° C. to obtain a sintered body, the sintered body has three-point bending strength of 1200 MPa or more.

In the above configuration, it is preferable that when the zirconia powder is molded at a mold pressure of 0.8 t/cm² and then sintered under a condition of 2 hours at 1450° C. to obtain a sintered body, the sintered body has three-point bending strength of 1300 MPa or more.

In the above configuration, it is preferable that when the zirconia powder is molded at a mold pressure of 0.8 t/cm² and then sintered under a condition of 2 hours at 1450° C. to obtain a sintered body, the sintered body has three-point bending strength of 1400 MPa or more.

In the above configuration, the zirconia powder may contain at least one selected from the group consisting of Fe, V, Er, Mn, Co, Cr, Tb, Zn, and Ti.

When the zirconia powder contains one or more selected from the group consisting of Fe, V, Er, Mn, Co, Cr, Tb, Zn, and Ti, the sintered body can be colored. The coloring depends on a combination of elements and an addition amount suitable for the combination, which will be described later.

In the above configuration, it is preferable that when the zirconia sintered body obtained by sintering the zirconia powder is colored in a shade of black, the zirconia powder contains 0.4 to 1.0 mass % of $Fe_2O_3$, 0.9 to 1.5 mass % of CoO, 1.0 to 1.6 mass % of $Cr_2O_3$, and 0.5 to 0.9 mass % of $TiO_2$ as a colorant. The colorant contained within the above range provides preferable coloring.

In the above configuration, it is preferable that when the zirconia sintered body obtained by sintering the zirconia powder is colored in different shade of black, the zirconia powder contains 0.9 to 1.5 mass % of CoO, 1.0 to 1.6 mass % of $Cr_2O_3$, and 0.8 to 1.4 mass % of $MnO_2$ as a colorant. The colorant contained within the above range provides preferable coloring.

In the above configuration, it is preferable that when the zirconia sintered body obtained by sintering the zirconia powder is colored in a shade of white, the zirconia powder contains 0.15 to 0.35 mass % of ZnO as a colorant. The colorant contained within the above range provides preferable coloring.

In the above configuration, it is preferable that when the zirconia sintered body obtained by sintering the zirconia powder is colored in a share of gray, the zirconia powder contains 0.02 to 0.1 mass % of $Cr_2O_3$ as a colorant. The colorant contained within the above range provides preferable coloring.

In the above configuration, it is preferable that when the zirconia sintered body obtained by sintering the zirconia powder is colored in a shade of gray, the zirconia powder contains 0.03 to 0.06 mass % of $MnO_2$ as a colorant under a condition that the zirconia powder has an alumina content of less than 0.005 mass % (a condition that the zirconia powder does not substantially contain alumina). The colorant contained within the above range provides preferable coloring.

In the above configuration, it is preferable that when the zirconia sintered body obtained by sintering the zirconia powder is colored in a shade of gray, the zirconia powder contains 0.02 to 0.05 mass % of $MnO_2$ as a colorant under a condition that the zirconia powder has an alumina content of 0.005 mass % or more and 2 mass % or less. The colorant contained within the above range provides preferable coloring.

In the above configuration, it is preferable that when the zirconia sintered body obtained by sintering the zirconia powder is colored in a shade of black, the zirconia powder contains 0.2 to 0.5 mass % of $MnO_2$ as a colorant under a condition that the zirconia powder has an alumina content of 0.005 mass % or more and 2 mass % or less. The colorant contained within the above range provides preferable coloring.

In the above configuration, it is preferable that when the zirconia sintered body obtained by sintering the zirconia powder is colored in a shade of brown, the zirconia powder contains 0.12 to 0.40 mass % of $Fe_2O_3$ as a colorant under a condition that the zirconia powder has an alumina content of 0.005 mass % or more and 2 mass % or less. The colorant contained within the above range provides preferable coloring.

In the above configuration, it is preferable that when the zirconia sintered body obtained by sintering the zirconia powder is colored in a shade of brown, the zirconia powder contains 0.12 to 0.23 mass % of $Fe_2O_3$ as a colorant under a condition that the zirconia powder has an alumina content of less than 0.005 mass % (a condition that the zirconia powder does not substantially contain alumina). The colorant contained within the above range provides preferable coloring.

In the above configuration, it is preferable that when the zirconia sintered body obtained by sintering the zirconia powder is colored in a shade of blue, the zirconia powder contains 0.3 to 1.0 mass % of CoO as a colorant under a condition that the zirconia powder has an alumina content of 1 mass % or more and 3 mass % or less. The colorant contained within the above range provides preferable coloring.

A method for producing a zirconia powder according to the present invention,
the method including:
a step A of mixing basic zirconium sulfate with an yttria sol solution to obtain a mixed solution; and
a step B of mixing the mixed solution with a base after the step A.

The yttria sol is used as a raw material for yttria, whereby the dispersibility of yttria in zirconia is easily controlled to a desired state.

A method for producing a zirconia sintered body according to the present invention, the method including:

a step X of molding a zirconia powder according to any one of claims 1 to 4 at a mold pressure of 0.7 t/cm$^2$ or more and 0.9 t/cm$^2$ or less to obtain a molded body; and a step Y of sintering the molded body under a condition of 1 hour or more and 5 hours or less at 1300° C. or higher and 1500° C. or lower after the step X.

According to the above configuration, the zirconia sintered body having high strength can be obtained in spite of molding at a low mold pressure of 0.7 t/cm$^2$ or more and 0.9 t/cm$^2$ or less.

In the above configuration, the obtained zirconia sintered body preferably has three-point bending strength of 1200 MPa or more.

A zirconia sintered body according to the present invention includes crystal phases that have a monoclinic crystal phase ratio of 1% or more and 3% or less, a tetragonal crystal phase ratio of 77% or more and 94% or less, and a cubic crystal phase ratio of 5 or more and 20% or less.

According to the above configuration, the zirconia sintered body includes crystal phases that have a monoclinic crystal phase ratio of 1% or more and 3% or less, a tetragonal crystal phase ratio of 77% or more and 94% or less, and a cubic crystal phase ratio of 5% or more and 20% or less, whereby the zirconia sintered body has high strength. This is also clear from Examples.

The zirconia sintered body is preferably produced by the method for producing the zirconia sintered body.

In the above configuration, the zirconia powder may contain at least one selected from the group consisting of Fe, V, Er, Mn, Co, Cr, Tb, Zn, and Ti.

When the zirconia sintered body contains at least one selected from the group consisting of Fe, V, Er, Mn, Co, Cr, Tb, Zn, and Ti, the zirconia sintered body can be suitably colored.

In the above configuration, it is preferable that when the zirconia sintered body is colored in black, the zirconia sintered body contains 0.4 to 1.0 mass % of $Fe_2O_3$, 0.9 to 1.5 mass % of CoO, 1.0 to 1.6 mass % of $Cr_2O_3$, and 0.5 to 0.9 mass % of $TiO_2$, and L*, a*, and b* specified in an L*a*b* color system are respectively 4 or more and 8 or less, −2 or more and 2 or less, and −3 or more and 1 or less. When the oxide is contained within the above range, L*, a*, and b* specified in the L*a*b* color system are likely to be set to be within the above numerical ranges, which provides preferable coloring.

In the above configuration, it is preferable that when the zirconia sintered body is colored in different black, the zirconia sintered body contains 0.9 to 1.5 mass % of CoO, 1.0 to 1.6 mass % of $Cr_2O_3$, and 0.8 to 1.4 mass % of $MnO_2$; and L*, a*, and b* specified in an L*a*b* color system are respectively 6 or more and 12 or less, −4 or more and 0 or less, and −3 or more and 1 or less. When the oxide is contained within the above range, L*, a*, and b* specified in the L*a*b* color system are likely to be set to be within the above numerical ranges, which provides preferable coloring.

In the above configuration, it is preferable that when the zirconia sintered body is colored in white, the zirconia sintered body contains 0.15 to 0.35 mass' of ZnO; and L*, a*, and b* specified in an L*a*b* color system are respectively 85 or more and 91 or less, −2 or more and 2 or less, and −1 or more and 3 or less. When the oxide is contained within the above range, L*, a*, and b* specified in the L*a*b* color system are likely to be set to be within the above numerical ranges, which provides preferable coloring.

In the above configuration, it is preferable that when the zirconia sintered body is colored in gray, the zirconia sintered body contains 0.02 to 0.1 mass' of $Cr_2O_3$; and L*, a*, and b* specified in an L*a*b* color system are respectively 35 or more and 47 or less, 0 or more and 6 or less, and 5 or more and 15 or less. When the oxide is contained within the above range, L*, a*, and b* specified in the L*a*b* color system are likely to be set to be within the above numerical ranges, which provides preferable coloring.

In the above configuration, it is preferable that when the zirconia sintered body is colored in gray, the zirconia sintered body contains 0.03 to 0.06 mass % of $MnO_2$ under a condition that the zirconia sintered body has an alumina content of less than 0.005 mass % (a condition that the zirconia sintered body does not substantially contain alumina), and L*, a*, and b* specified in an L*a*b* color system are respectively 33 or more and 39 or less, 2 or more and 8 or less, and −3 or more and 3 or less. When the oxide is contained within the above range, L*, a*, and b* specified in the L*a*b* color system are likely to be set to be within the above numerical ranges, which provides preferable coloring.

In the above configuration, it is preferable that when the zirconia sintered body is colored in gray, the zirconia sintered body contains 0.02 to 0.05 mass % of $MnO_2$ under a condition that the zirconia sintered body has an alumina content of 0.005 mass % or more and 2 mass % or less, and L*, a*, and b* specified in an L*a*b* color system are respectively 36 or more and 42 or less, 1 or more and 7 or less, and −4 or more and 2 or less. When the oxide is contained within the above range, L*, a*, and b* specified in the L*a*b* color system are likely to be set to be within the above numerical ranges, which provides preferable coloring.

In the above configuration, it is preferable that when the zirconia sintered body is colored in black, the zirconia sintered body contains 0.2 to 0.5 mass % of $MnO_2$ under a condition that the zirconia sintered body has an alumina content of 0.005 mass % or more and 2 mass % or less, and L*, a*, and b* specified in an L*a*b* color system are respectively 6 or more and 18 or less, 0 or more and 6 or less, and −5 or more and 1 or less. When the oxide is contained within the above range, L*, a*, and b* specified in the L*a*b* color system are likely to be set to be within the above numerical ranges, which provides preferable coloring.

In the above configuration, it is preferable that when the zirconia sintered body is colored in brown, the zirconia sintered body contains 0.12 to 0.40 mass % of $Fe_2O_3$ under a condition that the zirconia sintered body has an alumina content of 0.005 mass % or more and 2 mass % or less, and L*, a*, and b* specified in an L*a*b* color system are respectively 49 or more and 70 or less, 3 or more and 12 or less, and 23 or more and 35 or less. When the oxide is contained within the above range, L*, a*, and b* specified in the L*a*b* color system are likely to be set to be within the above numerical ranges, which provides preferable coloring.

In the above configuration, it is preferable that when the zirconia sintered body is colored in brown, the zirconia sintered body contains 0.12 to 0.23 mass % of $Fe_2O_3$ under a condition that the zirconia sintered body has an alumina content of less than 0.005 mass % (a condition that the zirconia sintered body does not substantially contain alumina), and L*, a*, and b* specified in an L*a*b* color system are respectively 46 or more and 56 or less, 7 or more and 13 or less, and 23 or more and 33 or less. When the oxide is contained within the above range, L*, a*, and b* specified in the L*a*b* color system are likely to be set to be within the above numerical ranges, which provides preferable coloring.

In the above configuration, it is preferable that when the zirconia sintered body is colored in blue, the zirconia sintered body contains 0.3 to 1.0 mass % of CoO under a condition that the zirconia sintered body has an alumina content of 1 mass % or more and 3 mass %, or less, and L*, a*, and b* specified in an L*a*b* color system are respectively 27 or more and 39 or less, −5 or more and 2 or less, and −45 or more and −33 or less. When the oxide is contained within the above range, L*, a*, and b* specified in the L*a*b* color system are likely to be set to be within the above numerical ranges, which provides preferable coloring.

Effect of the Invention

The present invention can provide a zirconia powder capable of easily producing a zirconia sintered body having high strength at a low mold pressure. The present invention can provide a method for producing the zirconia powder. The present invention can provide a method for producing a zirconia sintered body using the zirconia powder. The present invention provides a zirconia sintered body having high strength.

MODE FOR CARRYING OUT THE INVENTION

Hereinafter, embodiments of the present invention will be described. However, the present invention is not limited only to these embodiments. In the present specification, general zirconia is used, and contains 10 mass % or less of an impurity metal compound including hafnia. In the present specification, the terms "comprise" and "contain" include the concepts of "comprise", "contain", "substantially consist of", and "consist of".

[Zirconia Powder]

A zirconia powder according to the present embodiment contains 2.5 mol % or more and 3.5 mol % or less of yttria, wherein: the zirconia powder has a specific surface area of 5 $m^2/g$ or more and 20 $m^2/g$ or less, and includes crystal phases that have a monoclinic crystal phase ratio of 20% or more and 40% or less and a tetragonal crystal phase ratio of 60% or more and 80% or less; and when the zirconia powder is molded at a mold pressure of 0.8 $t/cm^2$ and then sintered under a condition of 2 hours at 1450° C. to obtain a sintered body, the sintered body includes crystal phases that have a monoclinic crystal phase ratio of 1% or more and 3% or less, a tetragonal crystal phase ratio of 77% or more and 94% or less, and a cubic crystal phase ratio of 5% or more and 20% or less.

The dispersed state of yttria is set to a specific state satisfying the above to control the crystal phases, which makes it possible to provide the zirconia powder that can provide a zirconia sintered body having high strength equivalent to that of a conventional product even if the mold pressure is low. This is also clear from Examples. The mold pressure may be low, whereby the use of the zirconia powder facilitates the mass production of the zirconia sintered body. For example, the use of various molding methods such as press molding, injection molding, cast molding, and sheet molding facilitates the mass production of the zirconia sintered body.

The zirconia powder contains zirconia. The content of zirconia is preferably 90 mass % or more, more preferably 92 mass % or more, still more preferably 94 mass % or more, and particularly preferably 94.3 mass % or more, when the amount of the zirconia powder is 100 mass %. The upper limit of the content of zirconia is not particularly limited, but the content of zirconia is preferably 97.5 mass % or less, more preferably 97.2 mass % or less, still more preferably 97 mass % or less, and particularly preferably 96.9 mass % or less.

In addition to zirconia, which is a main component, the zirconia powder contains 2.5 mol % or more and 3.5 mol % or less of yttria with respect to the total molar amount of the zirconia powder. Yttria can form a solid solution together with zirconia. Since the content ratio of yttria is 2.5 mol % or more, an excessive ratio of the monoclinic crystal phase in the sintered body of the zirconia powder can be suppressed. That is, the propagation of cracks by large volume expansion caused by phase transition from a tetragonal crystal phase to a monoclinic crystal phase is suppressed, whereby a reduction in the fracture toughness of the zirconia sintered body can be suppressed. High strength is known to be obtained when the content of yttria is less than 2.5 mol %, but hydrothermal deterioration characteristics and optical characteristics are less likely to be obtained.

The content ratio of yttria is 2.5 mol % or more and 3.5 mol % or less, preferably 2.6 mol % or more and 3.4 mol % or less, more preferably 2.7 mol % or more and 3.3 mol % or less, and still more preferably 2.8 mol % or more and 3.2 mol % or less. If the content of yttria is within the above numerical range and the dispersibility of yttria is controlled to control the crystal phase, a zirconia sintered body having high strength can be obtained even at a low mold pressure. A method for controlling the dispersibility of yttria is not particularly limited, but the dispersibility of yttria can be controlled by, for example, a producing method to be shown below and the like.

The zirconia powder may contain aluminum oxide (alumina), if necessary. The content of alumina is not particularly limited, and may be, for example, 0.005 mass % to 2 mass % with respect to the total mass of the zirconia powder. When the zirconia powder contains alumina, the sinterability of the zirconia powder is improved, and the crystal structure is likely to be homogenized. Since the zirconia powder contains alumina, a reduction in the fracture toughness of the zirconia sintered body is likely to be suppressed. Furthermore, the translucency of the zirconia sintered body can be improved by adjusting the content of alumina.

The content of alumina is more preferably 0.05 mass % or more and 0.15 mass % or less, or 0.20 mass % or more and 0.30 mass % or less.

When the content of alumina is 0.05 mass % or more and 0.15 mass % or less, the content of alumina is preferably 0.07 mass % or more, more preferably 0.09 mass % or more, and still more preferably 0.1 mass % or more. When the content of alumina is 0.05 mass %, or more and 0.15 mass % or less, the content of alumina is preferably 0.13 mass % or less, more preferably 0.11 mass % or less, and still more preferably 0.105 mass % or less.

When the content of alumina is 0.20 mass % or more and 0.30 mass % or less, the content of alumina is preferably 0.22 mass % or more, more preferably 0.24 mass % or more, and still more preferably 0.25 mass % or more. When the content of alumina is 0.20 mass % or more and 0.30 mass % or less, the content of alumina is preferably 0.28 mass % or less, more preferably 0.26 mass % or less, and still more preferably 0.255 mass % or less.

The content of alumina is more preferably 0.01 to 1 mass %, still more preferably 0.02 to 0.5 mass %, yet still more preferably 0.1 to 0.4 mass %, and particularly preferably 0.2 to 0.3 mass % with respect to the total mass of the zirconia powder.

The form of alumina is not particularly limited. An alumina powder is preferable from the viewpoint of ensuring handling properties during the preparation of the zirconia powder, and reducing residual impurities.

When the form of alumina is a powder, the average particle diameter of primary particles of alumina is not particularly limited, but the average particle diameter can be set to, for example, 0.02 to 0.4 µm, and is preferably 0.05 to 0.3 µm, and more preferably 0.07 to 0.2 µm.

The average particle diameter of the primary particles of alumina is a value measured using a laser diffraction type particle size distribution measuring device "SALD-2000" (manufactured by Shimadzu Corporation).

More specifically, the average particle diameter of the primary particles of alumina is a value measured in a state where 0.15 g of a sample and 40 ml of a 0.2% sodium hexametaphosphate aqueous solution are placed in a 50-ml beaker, and dispersed in a desktop ultrasonic cleaner "W-113" (manufactured by Honda Electronics Corporation) for 5 minutes, followed by placing the dispersed product in the device (laser diffraction type particle size distribution measuring device ("SALD-2000" manufactured by Shimadzu Corporation)).

The zirconia powder may contain other components as an alternative to a part of yttria. Examples of the other components include alkali earth metal oxides such as calcia and magnesia; and rare earth oxides such as ceria. The zirconia powder essentially contains an yttria component.

The average particle diameter of the zirconia powder is not particularly limited. For example, the average particle diameter of the zirconia powder may be 0.3 to 0.8 µm. When the average particle diameter of the zirconia powder is within the above range, a molded body having a high molding density is likely to be obtained, and a reduction in sinterability and sintered density is likely to be suppressed. When the average particle diameter of the zirconia powder is within the above range, it is not necessary to lengthen the grinding time of the grinding process. When the average particle diameter of the zirconia powder is 0.8 µm or less, the ratio of the monoclinic crystal phase in the powder is not overly high, whereby a sintered body having a high sintered density is likely to be obtained. The average particle diameter of the zirconia powder may be preferably 0.35 to 0.75 µm, and more preferably 0.4 to 0.7 µm.

The average particle diameter of the zirconia powder is a value measured using the laser diffraction type particle size distribution measuring device "SALD-2000" (manufactured by Shimadzu Corporation). More specifically, the average particle diameter is measured based on a method described in Examples.

The specific surface area of the zirconia powder is 5 m²/g or more and 20 m²/g or less. The specific surface area of the zirconia powder is 5 m²/g or more and 20 m²/g or less, whereby a molded body having a high molding density is likely to be obtained, and a reduction in sinterability and sintered density is likely to be suppressed. The specific surface area of the zirconia powder is preferably 6 to 18 m²/g, more preferably 6.5 to 15 m²/g, and still more preferably 7 to 13 m²/g.

In the present specification, the specific surface area of the zirconia powder refers to a BET specific surface area, and is a value measured using a specific surface area meter "Flowsorb II" (manufactured by Micromeritics Co., Ltd.).

The zirconia powder includes crystal phases that have a monoclinic crystal phase ratio of 20% or more and 40% or less and a tetragonal crystal phase ratio of 60% or more and 80% or less. The monoclinic crystal phase ratio is 20% or more and 40% or less, preferably 25% or more and 35% or less, and more preferably 27% or more and 35% or less. The tetragonal crystal phase ratio is 60% or more and 80% or less, preferably 65% or more and 75% or less, and more preferably 65% or more and 73% or less.

Zirconia that contains yttria as a stabilizer generally includes any one or all of a monoclinic crystal phase, a tetragonal crystal phase, and a cubic crystal phase.

In the present specification, the phase ratios of the crystal phases contained in the zirconia powder are calculated by the following formula.

Monoclinic crystal phase ratio (%)=(Im(111)+Im(11-1))/(Im(111)+Im(11-1)+It(101)+Ic(111))×100

Tetragonal crystal phase ratio (%)=(100%−monoclinic crystal phase (%))×((It(004)+It(220)/(It(004)+It(220)+Ic(004))×100

Cubic crystal phase ratio (%)=(100%−monoclinic crystal phase (%))×((Ic(004)/(It(004)+It(220)+Ic(004))×100

Here, Im(111) is the diffraction intensity of (111) in the monoclinic crystal phase, and Im(11-1) is the diffraction intensity of (11-1) in the monoclinic crystal phase.

It(101) is the diffraction intensity of (101) in the tetragonal crystal phase; It(220) is the diffraction intensity of (220) in the tetragonal crystal phase; and It(004) is the diffraction intensity of (004) in the tetragonal crystal phase.

Ic(004) is the diffraction intensity of (004) in the cubic crystal phase, and Ic(111) is the diffraction intensity of (111) in the cubic crystal phase.

The monoclinic crystal phase of zirconia is discriminated from the tetragonal crystal phase and the cubic crystal phase in the vicinity of 2θ=26 to 36° in the XRD spectrum. The tetragonal crystal phase is discriminated from the cubic crystal phase in the vicinity of 2θ=72 to 76° in the XRD spectrum. The cubic crystal phase may be distorted depending on the amount of the stabilizer added and the producing method, which may cause a peak position to shift. However, in the present specification, a peak between (004) and (220) in the tetragonal crystal phase is calculated as the peak of the cubic crystal phase.

Details of an X-ray diffractometer and XRD measurement conditions are as described in Examples.

The zirconia powder may contain at least one selected from the group consisting of Fe, V, Er, Mn, Co, Cr, Tb, Zn, and Ti. When the zirconia powder contains at least one selected from the group consisting of Fe, V, Er, Mn, Co, Cr, Tb, Zn, and Ti as a coloring element, a zirconia sintered body obtained by sintering the zirconia powder can be colored.

The form of the coloring element is not particularly limited, and the coloring element can be added in the form of an oxide or chloride or the like. Specific examples of the colorant containing the coloring element include $Fe_2O_3$, $V_2O_5$, $Er_2O_3$, $MnO_2$, $CoO$, $Cr_2O_3$, $Tb_4O_7$, $ZnO$, and $TiO_2$. The colorant is preferably added as a mixture to the zirconia powder.

<First Shade of Black>

It is preferable that when the zirconia sintered body obtained by sintering the zirconia powder is colored in a shade of black, the zirconia powder contains 0.4 to 1.0 mass % of $Fe_2O_3$, 0.9 to 1.5 mass % of CoO, 1.0 to 1.6 mass % of $Cr_2O_3$, and 0.5 to 0.9 mass % of $TiO_2$ as a colorant.

The content of $Fe_2O_3$ is more preferably 0.5 to 0.9 mass %, and still more preferably 0.6 to 0.8 mass %.

The content of CoO is more preferably 1.0 to 1.4 mass %, and still more preferably 1.1 to 1.3 mass %.

The content of $Cr_2O_3$ is more preferably 1.1 to 1.5 mass %, and still more preferably 1.2 to 1.4 mass %.

The content of $TiO_2$ is more preferably 0.55 to 0.85 mass %, and still more preferably 0.6 to 0.8 mass %.

The colorant contained within the above range provides preferable coloring.

<Second Shade of Black>

It is preferable that when the zirconia sintered body obtained by sintering the zirconia powder is colored in a shade of black different from the first black, the zirconia powder contains 0.9 to 1.5 mass % of CoO, 1.0 to 1.6 mass % of $Cr_2O_3$, and 0.8 to 1.4 mass % of $MnO_2$ as a colorant.

The content of CoO is more preferably 1.0 to 1.4 mass %, and still more preferably 1.1 to 1.3 mass %.

The content of $Cr_2O_3$ is more preferably 1.1 to 1.5 mass %, and still more preferably 1.2 to 1.4 mass %.

The content of $MnO_2$ is more preferably 0.9 to 1.3 mass %, and still more preferably 1.0 to 1.2 mass %.

The colorant contained within the above range provides preferable coloring.

<Third Shade of Black>

It is preferable that when the zirconia sintered body obtained by sintering the zirconia powder is colored in black different from the first and the second shades of black, the zirconia powder contains 0.2 to 0.5 mass % of $MnO_2$ as a colorant under a condition that the zirconia powder has an alumina content of 0.005 mass %, or more and 2 mass % or less.

The content of $MnO_2$ is more preferably 0.25 to 0.45 mass %, and still more preferably 0.3 to 0.4 mass %.

The colorant contained within the above range provides preferable coloring.

<Shade of White>

It is preferable that when the zirconia sintered body obtained by sintering the zirconia powder is colored in a shade of white, the zirconia powder contains 0.15 to 0.35 mass % of ZnO as a colorant.

The content of ZnO is more preferably 0.2 to 0.3 mass %, and still more preferably 0.22 to 0.28 mass %.

The colorant contained within the above range provides preferable coloring.

<First Shade of Gray>

It is preferable that when the zirconia sintered body obtained by sintering the zirconia powder is colored in a shade of gray, the zirconia powder contains 0.03 to 0.06 mass % of $MnO_2$ as a colorant under a condition that the zirconia powder has an alumina content of less than 0.005 mass % (a condition that the zirconia powder does not substantially contain alumina).

The content of $MnO_2$ is more preferably 0.035 to 0.055 mass %, and still more preferably 0.04 to 0.05 mass %.

The colorant contained within the above range provides preferable coloring.

<Second Shade of Gray>

It is preferable that when the zirconia sintered body obtained by sintering the zirconia powder is colored in a shade of gray, the zirconia powder contains 0.02 to 0.05 mass % of $MnO_2$ as a colorant under a condition that the zirconia powder has an alumina content of 0.005 mass % or more and 2 mass % or less.

The content of $MnO_2$ is more preferably 0.025 to 0.045 mass %, and still more preferably 0.03 to 0.04 mass %.

The colorant contained within the above range provides preferable coloring.

<Third Shade of Gray>

It is preferable that when the zirconia sintered body obtained by sintering the zirconia powder is colored in a shade of gray, the zirconia powder contains 0.02 to 0.1 mass % of $Cr_2O_3$.

The content of $Cr_2O_3$ is more preferably 0.04 to 0.08 mass %, and still more preferably 0.05 to 0.07 mass %.

The colorant contained within the above range provides preferable coloring.

<First Shade of Brown>

It is preferable that when the zirconia sintered body obtained by sintering the zirconia powder is colored in a shade of brown, the zirconia powder contains 0.12 to 0.23 mass % of $Fe_2O_3$ as a colorant under a condition that the zirconia powder has an alumina content of 0.005 mass % or more and 2 mass % or less.

The content of $Fe_2O_3$ is more preferably 0.14 to 0.21 mass %, and still more preferably 0.16 to 0.2 mass %.

The colorant contained within the above range provides preferable coloring.

<Second Shade of Brown>

It is preferable that when the zirconia sintered body obtained by sintering the zirconia powder is colored in a shade of brown, the zirconia powder contains 0.12 to 0.23 mass % of $Fe_2O_3$ as a colorant under a condition that the zirconia powder has an alumina content of less than 0.005 mass % (a condition that the zirconia powder does not substantially contain alumina).

The content of $Fe_2O_3$ is more preferably 0.14 to 0.21 mass %, and still more preferably 0.16 to 0.2 mass %.

The colorant contained within the above range provides preferable coloring.

<Third Shade of Brown>

It is preferable that when the zirconia sintered body obtained by sintering the zirconia powder is colored in a shade of brown having tint deeper than that of the first shade of brown, the zirconia powder preferably contains 0.23 to 0.40 mass % of $Fe_2O_3$ under a condition that the zirconia powder has an alumina content of 0.005 mass % or more and 2 mass or less.

The content of $Fe_2O_3$ is more preferably 0.25 to 0.35 mass %, and still more preferably 0.28 to 0.32 mass %.

The colorant contained within the above range provides preferable coloring.

<Shade of Blue>

It is preferable that when the zirconia sintered body obtained by sintering the zirconia powder is colored in a shade of blue, the zirconia powder contains 0.3 to 1.0 mass % of CoO under a condition that the zirconia powder has an alumina content of 1 mass % or more and 3 mass % or less.

The content of CoO is more preferably 0.4 to 0.8 mass %, and still more preferably 0.5 to 0.7 mass %.

The colorant contained within the above range provides preferable coloring.

It is preferable that when the zirconia powder is molded at a mold pressure of 0.8 t/cm² and then sintered under a condition of 2 hours at 1450° C. to obtain a sintered body, the sintered body includes crystal phases that have a monoclinic crystal phase ratio of 1% or more and 3% or less, a tetragonal crystal phase ratio of 77% or more and 94% or less, and a cubic crystal phase ratio of 5% or more and 20% or less. The monoclinic crystal phase ratio is 1% or more and 3% or less, preferably 1.1% or more and 2.5% or less, and more preferably 1.2% or more and 2% or less. The tetragonal crystal phase ratio is 77% or more and 94% or less, preferably 79.5% or more and 91.9% or less, and more preferably 82% or more and 90.8% or less. The cubic crystal phase ratio is 5% or more and 20% or less, preferably 7% or more and 18% or less, and more preferably 8% or more and 16% or less.

When the zirconia powder is molded at a mold pressure of 0.8 t/cm$^2$ and then sintered under a condition of 2 hours at 1450° C. to obtain a sintered body, the sintered body includes crystal phases that have a monoclinic crystal phase ratio of 1% or more and 3% or less, a tetragonal crystal phase ratio of 77% or more and 94% or less, and a cubic crystal phase ratio of 5% or more and 20% or less, whereby the dispersed state of yttria is in a specific state. Even if the molded body is formed at a low pressure, the obtained sintered body has high strength.

The phase ratios of the crystal phases contained in the sintered body are values obtained in the same manner as in the phase ratios of the crystal phases contained in the zirconia powder.

When the zirconia powder is molded at a mold pressure of 0.8 t/cm$^2$ and then sintered under a condition of 2 hours at 1450° C. to obtain a sintered body, the sintered body has three-point bending strength of preferably 1200 MPa or more, more preferably 1300 MPa or more, still more preferably 1350 MPa or more, and particularly preferably 1400 MPa or more. The three-point bending strength is more preferably higher, but for example, the three-point bending strength may be 1500 MPa or less, 1450 MPa or less, or 1410 MPa or less or the like. When the three-point bending strength is 1200 MPa or more, the sintered body produced by using the zirconia powder has high strength even if the zirconia powder is molded at a low pressure.

A detailed method of measuring the three-point bending strength is based on a method described in Examples.

The condition of "molded at a mold pressure of 0.8 t/cm$^2$ and then sintered under a condition of 2 hours at 1450° C." is a condition for molding and sintering for evaluating the physical properties of the zirconia powder on the assumption of a producing condition in which the zirconia powder is sintered after low-pressure molding. This does not mean that when the zirconia sintered body is produced using the zirconia powder, the zirconia powder is molded and sintered under the condition.

When the zirconia powder is molded at a mold pressure of 0.8 t/cm$^2$ and then sintered under a condition of 2 hours at 1450° C. to obtain a sintered body, the sintered body has a relative sintered density of preferably 99.5% or more, more preferably 99.6% or more, and still more preferably 99.7% or more. When the relative sintered density is within the above range, the sintered body produced by using the zirconia powder has particularly excellent performance.

The relative sintered density refers to a relative sintered density represented by the following formula (1):

$$\text{relative sintered density (\%)} = (\text{sintered density}/\text{theoretical sintered density}) \times 100 \quad (1)$$

Here, the theoretical sintered density ($\rho_0$) is a value calculated by the following formula (2-1).

$$\rho_0 = 100/[(Y/3.987) + (100-Y)/\rho z] \quad (2\text{-}1)$$

However, $\rho z$ is a value calculated by the following formula (2-2).

$$\rho z = [124.25(100-X) + 225.81X]/[150.5(100+X)A^2C] \quad (2\text{-}2)$$

Here, X and Y respectively represent an yttria concentration (mol %) and an alumina concentration (mass %). A and C are respectively values calculated by the following formulae (2-3) and (2-4).

$$A = 0.5080 + 0.06980X/(100+X) \quad (2\text{-}3)$$

$$C = 0.5195 - 0.06180X/(100+X) \quad (2\text{-}4)$$

In the formula (1), the theoretical sintered density varies depending on the composition of the powder. For example, the theoretical sintered density of yttria-containing zirconia is 6.112 g/cm$^3$ when the yttria content is 2 mol %, 6.092 g/cm$^3$ when the yttria content is 3 mol %, and 6.045 g/cm$^3$ when the yttria content is 5.5 mol %. The theoretical sintered density is a value when the alumina concentration is 0.25 mass %. The sintered density can be measured by the Archimedes method. More specifically, the sintered density is measured based on a method described in Examples. When a colorant is added, the calculation is performed in the same manner as that when alumina is added.

The zirconia powder according to the present embodiment has been described above.

[Method for Producing Zirconia Powder]

Hereinafter, an example of a method for producing a zirconia powder will be described. However, the method for producing a zirconia powder of the present invention is not limited to the following examples.

The method for producing a zirconia powder according to the present embodiment includes:

a step A of mixing basic zirconium sulfate with an yttria sol solution to obtain a mixed solution; and a step B of mixing the mixed solution with a base after the step A.

<Step A>

In the method for producing a zirconia powder according to the present embodiment, first, basic zirconium sulfate and an yttria sol solution are mixed (step A).

The basic zirconium sulfate is not particularly limited, and examples thereof include hydrates of compounds represented by $ZrOSO_4$—$ZrO_2$, $5ZrO_2$—$3SO_3$, and $7ZrO_2$—$3SO_3$ and the like. One or two or more thereof can be used.

Generally, these basic salts are obtained as aggregate particles having a particle diameter of 0.1 to several tens of μm as aggregates of fine particles having a small solubility and a particle diameter of several tens of angstroms according to optical measurement, and those obtained by known producing methods or commercially available products can be used. For example, those described in "Gmelin Handbuch, TEIL 42; Zirkonium (ISBN3-540-93242-9,334-353, 1958)" and the like can also be used.

As the raw material for yttria, the yttria sol is suitable as in the present embodiment. As the yttria sol, those obtained by known producing methods or commercially available products can be used.

The average particle diameter of the yttria sol is preferably 10 to 150 nm, more preferably 15 to 120 nm, still more preferably 20 to 100 nm, and particularly preferably 30 to 80 nm. When the average particle diameter of the yttria sol is 10 nm or more, the degree of dispersion of yttria in zirconia is suitable. The average particle diameter of the yttria sol is a value obtained by Zetasizer Nano ZS (manufactured by Spectris Co., Ltd.).

The concentration of the yttria sol solution is not particularly limited, but the concentration is preferably 1 to 30 mass %, and more preferably 3 to 25 mass %. Examples of the method for producing the yttria sol include a method described in JP-B-4518844.

The amount of the yttria sol added to the zirconia powder is preferably 2.5 to 3.5 mol %, more preferably 2.6 to 3.4 mol %, still more preferably 2.7 to 3.3 mol %, and particularly preferably 2.8 to 3.2 mol %, in terms of yttria.

A solvent used for mixing the basic zirconium sulfate with the yttria sol solution is not particularly limited as long as the solvent can disperse the basic zirconium sulfate and the yttria sol, but water (ion-exchanged water and the like) that is a polar solvent, and alcohols (for example, methanol and ethanol and the like) can be generally used. From the viewpoint of cost reduction, the solvent is most preferably water. The concentration of the mixed solution obtained by mixing the basic zirconium sulfate with the yttria sol solution can be appropriately changed depending on the composition ratio of the composite oxide, and the like, but the concentration may be generally about 1 to 25 mass %, and preferably 10 to 20 mass %.

The blending ratio of the basic zirconium sulfate and the yttria sol solution can be determined by appropriately adjusting the concentration of the solution, and the like so as to provide the composition ratio.

The temperature of the mixed solution may be generally 80° C. or lower, and preferably 20 to 50° C.

For mixing the basic zirconium sulfate with the yttria sol solution, it is preferable to drop the yttria sol solution little by little to the basic zirconium sulfate. The dropping time is preferably relatively long. Specifically, the dropping time is preferably 1 hour to 10 hours, more preferably 2 hours to 5 hours, and still more preferably 2.5 hours to 4 hours. The dropping time means a period from the start of dropping to the end of dropping. It is preferable that the mixing further includes stirring in addition to the dropping. If the dropping time is 1 hour or more, the segregation of yttria can be further suppressed. If the dropping time is 10 hours or less, the producing cost can be suppressed.

A desired stabilized phase of zirconia can be obtained by selecting a raw material for yttria, and adjusting various conditions in the step A to control the dispersibility of yttria in zirconia.

<Step B>

After the step A, a base is mixed with the mixed solution (step B). Thereby, a precipitate (zirconium hydride) is produced.

The base is not particularly limited, and known alkaline agents such as sodium hydroxide, potassium hydroxide, sodium carbonate, ammonium carbonate, and ammonia can be used. As the base, it is particularly preferable to use a strong alkali such as sodium hydroxide or potassium hydroxide. It is preferable to mix the base as an aqueous solution. In this case, the concentration of the aqueous solution is not particularly limited as long as the pH of the aqueous solution can be adjusted, but the concentration is generally about 5 to 50 mass %, and preferably 20 to 25 mass %.

After the base is mixed, if necessary, solid-liquid separation may be performed to obtain zirconium hydride, and the zirconium hydride may be washed with water. The solid-liquid separation method may be performed according to a general method such as centrifugal separation. The zirconium hydride treated with water can be re-dispersed in a dispersion medium such as water to obtain a zirconium hydride slurry.

Then, the zirconium hydride is heated in an atmosphere at a temperature (firing temperature) of 1000° C. to 1200° C. As a result of the heat treatment, the zirconium hydroxide is fired to form zirconia. If necessary, a grinding treatment or a classifying treatment or the like may be then carried out. The firing temperature is within the above range, whereby grinding, molding and sintering are easily controlled.

The firing temperature is preferably 1040 to 1180° C. The atmosphere during firing may be atmospheric air or an oxidizing atmosphere.

The rate of temperature rise from ordinary temperature (25° C.) to the firing temperature is not particularly limited, but the rate of temperature rise may be 50 to 200° C./hour, and is more preferably 100 to 150° C./hour.

The grinding method in the grinding treatment is not particularly limited, and examples thereof include a grinding method using a commercially available grinder such as a planetary mill, a ball mill, or a jet mill.

When the zirconia powder is produced, a raw material containing aluminum can be added. In this ease, the zirconia powder to be obtained may contain alumina.

Examples of the raw material containing aluminum include at least one of aluminum nitrate and aluminum chloride and the like. Examples of the raw material containing aluminum include an alumina sol and an alumina powder.

The purity of the raw material containing aluminum is preferably 95% or more, and more preferably 98% or more. The raw material containing aluminum is preferably an alumina powder from the viewpoint of cost, handling properties, and residual impurities.

The raw material containing aluminum can be appropriately added when each of the above steps is carried out, depending on the type of the raw material containing aluminum. For example, the alumina powder may be added to the zirconium hydride slurry before firing, or may be added to a fired product obtained by firing the zirconium hydride slurry.

The amount of the raw material containing aluminum used may be adjusted so that the content ratio of alumina is a desired content ratio in the zirconia powder to be obtained.

As described above, in the producing method of the present embodiment, the obtained zirconia powder may be ground into a slurry, if necessary. In this case, a binder can be added in order to improve moldability. When a slurry is not formed, a binder and the zirconia powder may be uniformly mixed by a kneader.

The binder is preferably an organic binder. The organic binder is likely to be removed from the molded body in a heating furnace in an oxidizing atmosphere, and a degreased body can be obtained, whereby finally, impurities are less likely to remain in the sintered body.

Examples of the organic binder include alcohol. Examples of the organic binder include those that are soluble in mixed solutions of two or more selected from the group consisting of alcohols, water, aliphatic ketones, and aromatic hydrocarbons. Specific examples include at least one selected from the group consisting of polyethylene glycol, glycol fatty acid ester, glycerol fatty acid ester, polyvinyl butyral, polyvinyl methyl ether, polyvinyl ethyl ether, and vinyl propionate. The organic binder may further contain one or more thermoplastic resins that are insoluble in alcohols, or the mixed solutions.

The target zirconia powder can be obtained by mixing the raw material containing aluminum and the organic binder and the like, and then applying a known method to perform treatments such as drying and grinding.

The method for producing the zirconia powder according to the present embodiment has been described above.

[Method for Producing Zirconia Sintered Body]

Hereinafter, an example of a method for producing a zirconia sintered body will be described. However, the method for producing a zirconia sintered body of the present invention is not limited to the following examples.

The method for producing a zirconia sintered body according to the present embodiment includes:

a step X of molding the zirconia powder at a mold pressure of 0.7 t/cm$^2$ or more and 0.9 t/cm$^2$ or less to obtain a molded body; and a step Y of sintering the molded body under a condition of 1 hour or more and 10 hours or less at 1350° C. or higher and 1550° C. or lower after the step X.

<Step X>

In the method for producing a zirconia sintered body according to the present embodiment, first, the zirconia powder is molded at a mold pressure of 0.7 t/cm$^2$ or more and 0.9 t/cm$^2$ or less to obtain a molded body (step X). The mold pressure is preferably 0.75 t/cm$^2$ or more and 0.9 t/cm$^2$ or less, and more preferably 0.75 t/cm$^2$ or more and 0.85 t/cm$^2$ or less.

When the zirconia powder is molded, a commercially available molding machine or a cold isostatic pressing method (CIP) can be adopted. The zirconia powder may be temporarily molded by a molding machine and then main-molded by press molding such as CIP. Conventionally, a zirconia powder molded body has been prepared under high pressure conditions, but in the present embodiment, the molded body is prepared at a relatively low mold pressure of 0.7 t/cm$^2$ or more and 0.9 t/cm$^2$ or less. In the present embodiment, the use of the zirconia powder can provide a sintered body having high strength even if a molded body is prepared at such a low mold pressure.

<Step Y>

After the step X, the molded body is sintered under a condition of 1 hour or more and 5 hours or less at 1300° C. or higher and 1500° C. or lower (step Y). As a result, the zirconia sintered body according to the present embodiment is obtained.

The sintering temperature during sintering is preferably 1300° C. or higher and 1500° C. or lower, more preferably 1400° C. or higher and 1490° C. or lower, and still more preferably 1420° C. or higher and 1480° C. or lower.

The holding time during sintering is preferably 1 hour or more and 5 hours or less, more preferably 2 hours or more and 4 hours or less, and still more preferably 2 hours or more and 3 hours or less. The atmosphere during firing may be atmospheric air or an oxidizing atmosphere.

The rate of temperature rise from ordinary temperature (25° C.) to the sintering temperature is not particularly limited, but the rate of temperature rise may be 50 to 200° C./hour, and is more preferably 100 to 150° C./hour.

The method for producing the zirconia sintered body according to the present embodiment has been described above.

[Zirconia Sintered Body]

The zirconia sintered body according to the present embodiment can be suitably produced by the method for producing the zirconia sintered body.

The zirconia sintered body according to the present embodiment includes crystal phases that have a monoclinic crystal phase ratio of 1% or more and 3% or less, a tetragonal crystal phase ratio of 77% or more and 94% or less, and a cubic crystal phase ratio of 5% or more and 20% or less. The monoclinic crystal phase ratio is 1% or more and 3% or less, preferably 1.1% or more and 2.5% or less, and more preferably 1.2% or more and 2% or less. The tetragonal phase ratio is 77% or more and 94% or less, preferably 79.5% or more and 91.9% or less, and more preferably 82% or more and 90.8% or less. The cubic crystal phase ratio is 5% or more and 20% or less, preferably 7% or more and 18% or less, and more preferably 8% or more and 16% or less.

The zirconia sintered body includes crystal phases that have a monoclinic crystal phase ratio of 1% or more and 3% or less, a tetragonal crystal phase ratio of 77% or more and 94% or less, and a cubic crystal phase ratio of 5% or more and 20% or less. Therefore, the dispersed state of yttria is a specific state, which provides high strength.

The phase ratios of the crystal phases included in the sintered body are values obtained in the same manner as in the phase ratios of the crystal phases included in the zirconia powder.

The zirconia sintered body has three-point bending strength of preferably 1200 MPa or more, more preferably 1300 MPa or more, still more preferably 1350 MPa or more, and particularly preferably 1400 MPa or more. The three-point bending strength is more preferably higher, but for example, the three-point bending strength may be 1500 MPa or less, 1450 MPa or less, or 1410 MPa or less or the like. When the three-point bending strength is 1200 MPa or more, the strength can be said to be high.

A detailed method of measuring the three-point bending strength is based on a method described in Examples.

The zirconia sintered body may contain at least one selected from the group consisting of Fe, V, Er, Mn, Co, Cr, Tb, Zn, and Ti. When the zirconia sintered body contains at least one selected from the group consisting of Fe, V, Er, Mn, Co, Cr, Tb, Zn, and Ti as a coloring element, the zirconia sintered body can be suitably colored.

The form of the coloring element is not particularly limited, and the coloring element can be added in the form of an oxide or chloride or the like. Specific examples of the colorant containing the coloring element include $Fe_2O_3$, $V_2O_5$, $Er_2O_3$, $MnO_2$, $CoO$, $Cr_2O_3$, $Tb_4O_7$, $ZnO$, and $TiO_2$.

<First Shade of Black>

It is preferable that when the zirconia sintered body is colored in black, the zirconia sintered body contains 0.4 to 1.0 mass % of $Fe_2O_3$, 0.9 to 1.5 mass % of CoO, 1.0 to 1.6 mass %, of $Cr_2O_3$, and 0.5 to 0.9 mass %, of $TiO_2$, and L*, a*, and b* specified in an L*a*b* color system are respectively 4 or more and 8 or less, −2 or more and 2 or less, and −3 or more and 1 or less.

The content of $Fe_2O_3$ is more preferably 0.5 to 0.9 mass %, and still more preferably 0.6 to 0.8 mass %.

The content of CoO is more preferably 1.0 to 1.4 mass %, and still more preferably 1.1 to 1.3 mass %.

The content of $Cr_2O_3$ is more preferably 1.1 to 1.5 mass %, and still more preferably 1.2 to 1.4 mass %.

The content of $TiO_2$ is more preferably 0.55 to 0.85 mass %, and still more preferably 0.6 to 0.8 mass %.

The L* is more preferably 4.5 or more and 7 or less, and still more preferably 5 or more and 6.5 or less.

The a* is more preferably −1.5 or more and 1 or less, and still more preferably −1 or more and 0 or less.

The b* is more preferably −2 or more and 0 or less, and still more preferably −1.5 or more and −0.5 or less.

When the oxide is contained within the above range, L*, a*, and b* specified in the L*a*b* color system are likely to be set to be within the above numerical ranges, which provides preferable coloring.

<Second Shade of Black>

It is preferable that when the zirconia sintered body is colored in different black, the zirconia sintered body contains 0.9 to 1.5 mass % of CoO, 1.0 to 1.6 mass % of $Cr_2O_3$, and 0.8 to 1.4 mass % of $MnO_2$; and L*, a*, and b* specified in an L*a*b* color system are respectively 6 or more and 12 or less, −4 or more and 0 or less, and −3 or more and 1 or less.

The content of CoO is more preferably 1.0 to 1.4 mass %, and still more preferably 1.1 to 1.3 mass %.

The content of $Cr_2O_3$ is more preferably 1.1 to 1.5 mass %, and still more preferably 1.2 to 1.4 mass %.

The content of $MnO_2$ is more preferably 0.9 to 1.3 mass %, and still more preferably 1.0 to 1.2 mass %.

The L* is more preferably 7 or more and 11 or less, and still more preferably 8 or more and 9 or less.

The a* is more preferably −3.5 or more and −0.5 or less, and still more preferably −2 or more and −1 or less.

The b* is more preferably −2 or more and 0 or less, and still more preferably −1.5 or more and −0.5 or less.

When the oxide is contained within the above range, L*, a*, and b* specified in the L*a*b* color system are likely to be set to be within the above numerical ranges, which provides preferable coloring.

<Third Shade of Black>

It is preferable that when the zirconia sintered body is colored in different black, the zirconia sintered body contains 0.02 to 0.05 mass of $MnO_2$ under a condition that the zirconia sintered body has an alumina content of 0.005 mass % or more and 2 mass % or less, and L*, a*, and b* specified in an L*a*b* color system are respectively 6 or more and 18 or less, 0 or more and 6 or less, and −5 or more and 1 or less.

The content of $MnO_2$ is more preferably 0.25 to 0.45 mass %, and still more preferably 0.3 to 0.4 mass %.

The L* is more preferably 8 or more and 16 or less, and still more preferably 10 or more and 14 or less.

The a* is more preferably 1 or more and 5 or less, and still more preferably 2 or more and 4 or less.

The b* is more preferably −4 or more and 0 or less, and still more preferably −3 or more and −1 or less.

When the oxide is contained within the above range, L*, a*, and b* specified in the L*a*b* color system are likely to be set to be within the above numerical ranges, which provides preferable coloring.

<Shade of White>

It is preferable that when the zirconia sintered body is colored in white, the zirconia sintered body contains 0.15 to 0.35 mass % of ZnO; and L*, a*, and b* specified in an L*a*b* color system are respectively 85 or more and 91 or less, −2 or more and 2 or less, and −1 or more and 3 or less.

The content of ZnO is more preferably 0.2 to 0.3 mass %, and still more preferably 0.22 to 0.28 mass %.

The L* is more preferably 86 or more and 90 or less, and still more preferably 87 or more and 89 or less.

The a* is more preferably −1.5 or more and 1 or less, and still more preferably −1 or more and 0 or less.

The b* is more preferably 0 or more and 2.5 or less, and still more preferably 1 or more and 2 or less.

When the oxide is contained within the above range, L*, a*, and b* specified in the L*a*b* color system are likely to be set to be within the above numerical ranges, which provides preferable coloring.

<First Shade of Gray>

It is preferable that when the zirconia sintered body is colored in gray, the zirconia sintered body contains 0.03 to 0.06 mass % of $MnO_2$ under a condition that the zirconia sintered body has an alumina content of less than 0.005 mass % (a condition that the zirconia sintered body does not substantially contain alumina), and L*, a*, and b* specified in an L*a*b* color system are respectively 33 or more and 39 or less, 2 or more and 8 or less, and −3 or more and 3 or less.

The content of $MnO_2$ is more preferably 0.035 to 0.055 mass %, and still more preferably 0.04 to 0.05 mass %.

The L* is more preferably 34 or more and 38 or less, and still more preferably 35 or more and 37 or less.

The a* is more preferably 3 or more and 7 or less, and still more preferably 4 or more and 6 or less.

The b* is more preferably −2 or more and 2 or less, and still more preferably −1 or more and 1 or less.

When the oxide is contained within the above range, L*, a*, and b* specified in the L*a*b* color system are likely to be set to be within the above numerical ranges, which provides preferable coloring.

<Second Shade of Gray>

It is preferable that when the zirconia sintered body is colored in gray, the zirconia sintered body contains 0.02 to 0.05 mass % of $MnO_2$ under a condition that the zirconia sintered body has an alumina content of 0.005 mass % or more and 2 mass % or less, and L*, a*, and b* specified in an L*a*b* color system are respectively 36 or more and 42 or less, 1 or more and 7 or less, and −4 or more and 2 or less.

The content of $MnO_2$ is more preferably 0.025 to 0.045 mass %, and still more preferably 0.03 to 0.04 mass %.

The L* is more preferably 37 or more and 41 or less, and still more preferably 38 or more and 40 or less.

The a* is more preferably 2 or more and 6 or less, and still more preferably 3 or more and 5 or less.

The b* is more preferably −3 or more and 1 or less, and still more preferably −2 or more and 0 or less.

When the oxide is contained within the above range, L*, a*, and b* specified in the L*a*b* color system are likely to be set to be within the above numerical ranges, which provides preferable coloring.

<Third Shade of Gray>

It is preferable that when the zirconia sintered body is colored in different gray, the zirconia sintered body contains 0.02 to 0.1 mass % of $Cr_2O_3$; and L*, a*, and b* specified in an L*a*b* color system are respectively 35 or more and 47 or less, 0 or more and 6 or less, and 5 or more and 15 or less.

The content of $Cr_2O_3$ is more preferably 0.04 to 0.08 mass %, and still more preferably 0.05 to 0.07 mass %.

The L* is more preferably 37 or more and 45 or less, and still more preferably 39 or more and 43 or less.

The a* is more preferably 1 or more and 5 or less, and still more preferably 2 or more and 4 or less.

The b* is more preferably 7 or more and 13 or less, and still more preferably 9 or more and 12 or less.

When the oxide is contained within the above range, L*, a*, and b* specified in the L*a*b* color system are likely to be set to be within the above numerical ranges, which provides preferable coloring.

<First Shade of Brown>

It is preferable that when the zirconia sintered body is colored in brown, the zirconia sintered body contains 0.12 to 0.23 mass % of $Fe_2O_3$ under a condition that the zirconia sintered body has an alumina content of 0.005 mass % or more and 2 mass % or less, and L*, a*, and b* specified in an L*a*b* color system are respectively 60 or more and 70 or less, 3 or more and 9 or less, and 23 or more and 33 or less.

The content of $Fe_2O_3$ is more preferably 0.14 to 0.21 mass %, and still more preferably 0.16 to 0.2 mass %.

The $L^*$ is more preferably 62 or more and 68 or less, and still more preferably 63 or more and 67 or less.

The $a^*$ is more preferably 4 or more and 8 or less, and still more preferably 5 or more and 7 or less.

The $b^*$ is more preferably 25 or more and 31 or less, and still more preferably 26 or more and 30 or less.

When the oxide is contained within the above range, $L^*$, $a^*$, and $b^*$ specified in the $L^*a^*b^*$ color system are likely to be set to be within the above numerical ranges, which provides preferable coloring.

<Second Shade of Brown>

It is preferable that when the zirconia sintered body is colored in brown, the zirconia sintered body contains 0.12 to 0.23 mass % of $Fe_2O_3$ under a condition that the zirconia sintered body has an alumina content of less than 0.005 mass % (a condition that the zirconia sintered body does not substantially contain alumina), and $L^*$, $a^*$, and $b^*$ specified in an $L^*a^*b^*$ color system are respectively 46 or more and 56 or less, 7 or more and 13 or less, and 23 or more and 33 or less.

The content of $Fe_2O_3$ is more preferably 0.14 to 0.21 mass %, and still more preferably 0.16 to 0.2 mass %.

The $L^*$ is more preferably 47 or more and 55 or less, and still more preferably 49 or more and 53 or less.

The $a^*$ is more preferably 8 or more and 12 or less, and still more preferably 9 or more and 11.5 or less.

The $b^*$ is more preferably 25 or more and 31 or less, and still more preferably 27 or more and 30 or less.

When the oxide is contained within the above range, $L^*$, $a^*$, and $b^*$ specified in the $L^*a^*b^*$ color system are likely to be set to be within the above numerical ranges, which provides preferable coloring.

<Third Shade of Brown>

It is preferable that when the zirconia sintered body is colored in brown having tint deeper than that of the first brown, the zirconia sintered body contains 0.23 to 0.40 mass % of $Fe_2O_3$ under a condition that the zirconia sintered body has an alumina content of 0.005 mass % or more and 2 mass % or less, and $L^*$, $a^*$, and $b^*$ specified in an $L^*a^*b^*$ color system are respectively 49 or more and 59 or less, 6 or more and 12 or less, and 25 or more and 35 or less.

The content of $Fe_2O_3$ is more preferably 0.25 to 0.35 mass %, and still more preferably 0.28 to 0.32 mass %.

The $L^*$ is more preferably 51 or more and 57 or less, and still more preferably 52 or more and 56 or less.

The $a^*$ is more preferably 7 or more and 11 or less, and still more preferably 8 or more and 10.5 or less.

The $b^*$ is more preferably 27 or more and 33 or less, and still more preferably 28 or more and 32 or less.

When the oxide is contained within the above range, $L^*$, $a^*$, and $b^*$ specified in the $L^*a^*b^*$ color system are likely to be set to be within the above numerical ranges, which provides preferable coloring.

<Shade of Blue>

It is preferable that when the zirconia sintered body is colored in different blue, the zirconia sintered body contains 0.3 to 1.0 mass % of CoO under a condition that the zirconia sintered body has an alumina content of 1 mass % or more and 3 mass % or less, and $L^*$, $a^*$, and $b^*$ specified in an $L^*a^*b^*$ color system are respectively 27 or more and 39 or less, −5 or more and 2 or less, and −45 or more and −33 or less.

The content of CoO is more preferably 0.4 to 0.8 mass %, and still more preferably 0.5 to 0.7 mass %.

The $L^*$ is more preferably 29 or more and 37 or less, and still more preferably 31 or more and 36 or less.

The $a^*$ is more preferably −4 or more and 1 or less, and still more preferably −3 or more and 0 or less.

The $b^*$ is more preferably −42 or more and −35 or less, and still more preferably −41 or more and −37 or less.

When the oxide is contained within the above range, $L^*$, $a^*$, and $b^*$ specified in the $L^*a^*b^*$ color system are likely to be set to be within the above numerical ranges, which provides preferable coloring.

The $L^*a^*b^*$ color system is a color space that is endorsed by Commission Internationale de l'Eclairage (CIE) in 1976, and means a color space that is called a CIE1976 ($L^*a^*b^*$) color system. The $L^*a^*b^*$ color system is specified in JIS Z 8729 in the Japanese Industrial Standards.

The zirconia sintered body according to the present embodiment has been described above.

EXAMPLES

Hereinafter, the present invention will be described in detail with reference to Examples, but the present invention is not limited to the following Examples as long as the gist of the present invention is not exceeded. Zirconia powders obtained in Examples and Comparative Examples contain 1.3 to 2.5 mass % of hafnium oxide as unavoidable impurities with respect to zirconium oxide (calculated by the following formula (X)).

([Mass of Hafnium Oxide]/([Mass of Zirconium Oxide]+[Mass of Hafnium Oxide]))×100(%)  <Formula (X)>

[Preparation of Zirconia Powder]

Example 1

Basic zirconium sulfate (containing 100 g of zirconium oxide) was dispersed in 1000 g of water to prepare a basic zirconium sulfate slurry. An yttria sol solution having a concentration of 5% (manufactured by Daiichi Kigenso Kagaku Kogyo Co., Ltd., average particle diameter of yttria sol: 30 nm) was weighed so as to be 3 mol % with respect to zirconia. The average particle diameter of the yttria sol is a value obtained by Zetasizer Nano ZS (manufactured by Spectris Co., Ltd.). Specifically, measurement conditions are as follows.

Model: Zetasizer Nano ZS (manufactured by Spectris Co., Ltd.)

Measured concentration: 30% in terms of metal oxide

Measurement temperature: 25° C.

Scattering angle: 173°

While the basic zirconium sulfate slurry was stirred, the weighed yttria sol solution was dropped to the basic zirconium sulfate slurry over 3 hours, followed by mixing. As a result, a mixed solution was obtained.

Next, a sodium hydroxide aqueous solution of 25% by weight was added to the mixed solution until the pH reached 13.5, to obtain a precipitate.

Next, the produced precipitate was subjected to solid-liquid separation. The solid content was washed with water, and recovered.

Next, the recovered solid content was fired in atmospheric air at 1100° C. for 2 hours to obtain zirconium oxide. A heating rate was 100° C./hour.

An alumina powder having an average particle diameter of 0.1 μm as primary particles was added to the obtained zirconium oxide in an amount of 0.25 mass % with respect to the zirconium oxide, followed by grinding and mixing in a wet ball mill using water as a dispersion medium for 30 hours. The obtained slurry was dried at 120° C. until the amount became constant, to obtain a zirconia powder according to Example 1.

Example 2

A zirconia powder according to Example 2 was obtained in the same manner as in Example 1 except that a firing temperature was changed to 1200° C.

Example 3

A zirconia powder according to Example 3 was obtained in the same manner as in Example 1 except that a firing temperature was changed to 1170° C. and a ball mill grinding time was changed to 40 hours.

Example 4

A zirconia powder according to Example 4 was obtained in the same manner as in Example 1 except that the amount of an alumina powder added was changed to 0.1 mass %.

Example 5

A zirconia powder according to Example 5 was obtained in the same manner as in Example 1 except that the amount of an yttria sol solution added was changed to 2.6 mol % with respect to zirconia; when an alumina powder was added, 0.7 mass % of an $Fe_2O_3$ powder, 1.2 mass % of a CoO powder, 1.3 mass % of a $Cr_2O_3$ powder, and 0.7 mass % of a $TiO_2$ powder were further added as a colorant; a firing temperature was changed to 1170° C.; and a ball mill grinding time was changed to 40 hours.

Example 6

A zirconia powder according to Example 6 was obtained in the same manner as in Example 1 except that the amount of an yttria sol solution added was changed to 2.6 mol with respect to zirconia; the amount of an alumina powder added was changed to 0.70 mass %; when the alumina powder was added, 1.2 mass % of a CoO powder, 1.3 mass % of a $Cr_2O_3$ powder, and 1.1 mass % of an $MnO_2$ powder were further added as a colorant; a firing temperature was changed to 1170° C.; and a ball mill grinding time was changed to 40 hours.

Example 7

A zirconia powder according to Example 7 was obtained in the same manner as in Example 1 except that the amount of an yttria sol solution added was changed to 2.6 mol % with respect to zirconia; when an alumina powder was added, 0.25 mass % of a ZnO powder was further added as a colorant; a firing temperature was changed to 1170° C.; and a ball mill grinding time was changed to 40 hours.

Example 8

A zirconia powder according to Example 8 was obtained in the same manner as in Example 1 except that the amount of an yttria sol solution added was changed to 3.2 mol % with respect to zirconia; the amount of an alumina powder added was changed to 0.1 mass %; 0.05 mass % of a $Cr_2O_3$ powder was further added as a colorant; a firing temperature was changed to 1170° C.; and a ball mill grinding time was changed to 40 hours.

Example 9

A zirconia powder according to Example 9 was obtained in the same manner as in Example 1 except that the amount of an yttria sol solution added was changed to 3.2 mol % with respect to zirconia; and 0.045 mass % of an $MnO_2$ powder was added as a colorant without an alumina powder being added.

Example 10

A zirconia powder according to Example 10 was obtained in the same manner as in Example 1 except that the amount of an yttria sol solution added was changed to 3.2 mol % with respect to zirconia; the amount of an alumina powder added was changed to 0.10 mass %; when the alumina powder was added, 0.035 mass % of an $MnO_2$ powder was further added as a colorant; a firing temperature was changed to 1170° C.; and a ball mill grinding time was changed to 40 hours.

Example 11

A zirconia powder according to Example 11 was obtained in the same manner as in Example 1 except that the amount of an yttria sol solution added was changed to 3.2 mol % with respect to zirconia; the amount of an alumina powder added was changed to 0.10 mass %; when the alumina powder was added, 0.32 mass % of an $MnO_2$ powder was further added as a colorant; a firing temperature was changed to 1170° C.; and a ball mill grinding time was changed to 40 hours.

Example 12

A zirconia powder according to Example 12 was obtained in the same manner as in Example 1 except that the amount of an yttria sol solution added was changed to 3.2 mol % with respect to zirconia; and when an alumina powder was added, 0.18 mass % of an $Fe_2O_3$ powder was further added as a colorant.

Example 13

A zirconia powder according to Example 13 was obtained in the same manner as in Example 1 except that the amount of an yttria sol solution added was changed to 3.2 mol % with respect to zirconia; the amount of an alumina powder added was changed to 0.10 mass %; when the alumina powder was added, 0.18 mass % of an $Fe_2O_3$ powder was further added as a colorant; a firing temperature was changed to 1170° C.; and a ball mill grinding time was changed to 40 hours.

Example 14

A zirconia powder according to Example 14 was obtained in the same manner as in Example 1 except that the amount of an yttria sol solution added was changed to 3.2 mol % with respect to zirconia; and 0.18 mass %, of an $Fe_2O_3$ powder was added as a colorant without an alumina powder being added.

Example 15

A zirconia powder according to Example 15 was obtained in the same manner as in Example 1 except that the amount of an yttria sol solution added was changed to 3.2 mol % with respect to zirconia; when an alumina powder was added, 0.3 mass % of an $Fe_2O_3$ powder was further added as a colorant; a firing temperature was changed to 1170° C.; and a ball mill grinding time was changed to 40 hours.

Example 16

A zirconia powder according to Example 16 was obtained in the same manner as in Example 1 except that the amount of an yttria sol solution added was changed to 2.6 mol % with respect to zirconia; the amount of an alumina powder added was changed to 1.85 mass %; 0.6 mass % of a CoO powder was further added as a colorant; a firing temperature was changed to 1170° C.; and a ball mill grinding time was changed to 40 hours.

Comparative Example 1

A zirconia powder according to Comparative Example 1 was obtained in the same manner as in Example 1 except that the dropping time of an yttria sol solution was changed to 1 minute.

Comparative Example 2

A zirconia powder according to Comparative Example 2 was obtained in the same manner as in Example 1 except that a yttrium chloride solution having the same concentration as that of an yttria sol solution was used instead of the yttria sol solution.

Comparative Example 3

A zirconia powder according to Comparative Example 3 was obtained in the same manner as in Example 1 except that an yttria powder having the same yttria amount as that of an yttria sol solution was used instead of the yttria sol solution.

Comparative Example 4

A zirconia powder according to Comparative Example 4 was obtained in the same manner as in Example 4 except that an yttria sol solution was changed to an yttria sol solution having an average particle diameter of 3 nm.

[Measurement of Composition of Zirconia Powder]

The compositions (in terms of oxide) of the zirconia powders of Examples and Comparative Examples were analyzed using ICP-AES ("ULTIMA-2" manufactured by HORIBA). The results are shown in Table 1.

[Identification of Crystal Phases]

X-ray diffraction spectra of the zirconia powders of Examples and Comparative Examples were obtained using an X-ray diffractometer ("RINT2500" manufactured by Rigaku Corporation). The measurement conditions were as follows.

<Measurement Conditions>
Measuring instrument: X-ray diffractometer (RINT2500 manufactured by Rigaku Corporation)
Radiation source: CuKα radiation source
Tube voltage: 50 kV
Tube current: 300 mA
Scanning speed: 2θ=26 to 36°: 4°/min
2θ=72 to 76°: 1°/min Then, the crystal phases were identified from the X-ray diffraction spectrum. The phase ratio of each crystal phase included in the zirconia-based porous body was calculated by the following formula.

Monoclinic crystal phase ratio (%)=(Im(111)+Im(11-1))/(Im(111)+Im(11-1)+It(101)+Ic(111))×100

Tetragonal crystal phase ratio (%)=(100%−monoclinic crystal phase (%)×((It(004)+It(220)/(It(004)+It(220)+Ic(004))×100

Cubic crystal phase ratio (%)=(100%−monoclinic crystal phase (%))×((Ic(004)/(It(004)+It(220)+Ic(004))×100

Here, Im(111) is the diffraction intensity of (111) in the monoclinic crystal phase, and Im(11-1) is the diffraction intensity of (11-1) in the monoclinic crystal phase.

It(101) is the diffraction intensity of (101) in the tetragonal crystal phase; It(220) is the diffraction intensity of (220) in the tetragonal crystal phase; and It(004) is the diffraction intensity of (004) in the tetragonal crystal phase.

Ic(004) is the diffraction intensity of (004) in the cubic crystal phase, and Ic(111) is the diffraction intensity of (111) in the cubic crystal phase.

The monoclinic crystal phase of zirconia was discriminated from the tetragonal crystal phase and the cubic crystal phase in the vicinity of 2θ=26 to 36° in the XRD spectrum. The tetragonal crystal phase was discriminated from the cubic crystal phase in the vicinity of 2θ=72 to 76° in the XRD spectrum. The cubic crystal phase may be distorted depending on the amount of the stabilizer added and the producing method, which may cause a peak position to shift. However, in the present Examples, a peak between (004) and (220) in the tetragonal crystal phase is calculated as the peak of the cubic crystal phase. The results are shown in Table 1.

[Average Particle Diameter]

The average particle diameter of the zirconia powder of each of Examples and Comparative Examples was measured using a laser diffraction type particle size distribution measuring device "SALD-2000" (manufactured by Shimadzu Corporation). More specifically, the average particle diameter was measured in a state where 0.15 g of a sample and 40 ml of a 0.2% sodium hexametaphosphate aqueous solution were placed in a 50-ml beaker, were dispersed by a desk ultrasonic cleaner "W-113" (manufactured by Honda Electronics Corporation) for 5 minutes, followed by placing the dispersed product in the device (laser diffraction type particle size distribution measuring device ("SALD-2000" manufactured by Shimadzu Corporation)). The results are shown in Table 1.

[Measurement of Specific Surface Area]

The specific surface area of the zirconia powder of each of Examples and Comparative Examples was measured by the BET method using a specific surface area meter ("Macsorb", manufactured by Mountec). The results are shown in Table 1.

[Crystal Phase Ratios of Sintered Body when Zirconia Powder is Molded at Mold Pressure of 0.8 t/cm² and then Sintered Under Condition of 2 Hours at 1450° C. to Obtain Sintered Body]

The zirconia powder of each of Examples and Comparative Examples was molded at a mold pressure of 0.8 t/cm². Then, the molded body was sintered at a normal pressure (1 atm) under a condition of 2 hours at 1450° C. The crystal phase ratios of the obtained sintered body were determined in the same manner as in the above-described "Identification of Crystal Phases". The results are shown in Table 1.

[Three-Point Bending Strength of Sintered Body when Zirconia Powder is Molded at Mold Pressure of 0.8 t/cm² and then Sintered Under Condition of 2 Hours at 1450° C. to Obtain Sintered Body]

The zirconia powder of each of Examples and Comparative Examples was molded at a mold pressure of 0.8 t/cm². Then, the molded body was sintered at a normal pressure (1 atm) under a condition of 2 hours at 1450° C. The three-point bending strength of the obtained sintered body was measured in accordance with three-point bending strength in JIS R 1601. The results are shown in Table 1.

[Relative Sintered Density of Sintered Body when Zirconia Powder is Molded at Mold Pressure of 0.8 t/cm² and then Sintered Under Condition of 2 Hours at 1450° C. to Obtain Sintered Body]

The zirconia powder of each of Examples and Comparative Examples was molded at a mold pressure of 0.8 t/cm². Then, the molded body was sintered at a normal pressure (1 atm) under a condition of 2 hours at 1450° C. Then, the relative sintered density of the obtained sintered body was determined according to the following formula (1).

The relative sintered density refers to a relative sintered density represented by the following formula (1):

$$\text{relative sintered density (\%)} = (\text{sintered density}/\text{theoretical sintered density}) \times 100 \quad (1)$$

Here, the theoretical sintered density ($\rho_0$) is a value calculated by the following formula (2-1).

$$\rho_0 = 100/[(Y/3.987) + (100-Y)/\rho z] \quad (2\text{-}1)$$

However, $\rho z$ is a value calculated by the following formula (2-2).

$$\rho z = [124.25(100-X) + 225.81X]/[150.5(100+X)A^2C] \quad (2\text{-}2)$$

Here, X and Y respectively represent an yttria concentration (mol %) and an alumina concentration (mass %). A and C are respectively values calculated by the following formulae (2-3) and (2-4).

$$A = 0.5080 + 0.06980X/(100+X) \quad (2\text{-}3)$$

$$C = 0.5195 - 0.06180X/(100+X) \quad (2\text{-}4)$$

In the formula (1), the theoretical sintered density varies depending on the composition of the powder. In the present Examples, the yttria concentration is 3 mol %, so that the theoretical sintered density is 6.092 g/cm³. The theoretical sintered density is coupled with the amount of alumina of 0.25%. The sintered density was measured by the Archimedes method.

When a colorant was added, the calculation was performed in the same manner as that when alumina was added.

[Color Tone of Sintered Body]

The zirconia powder of each of Examples 5 to 13 was molded at a mold pressure of 0.8 t/cm². Then, the molded body was sintered at a normal pressure (1 atm) under a condition of 2 hours at 1450° C. The color tone of the obtained sintered body was measured using a colorimeter (trade name: CM-3500d, manufactured by Konica Minolta). In Examples other than Examples 5 to 13 and Comparative Examples, no colorant is added, so that the color tone is not measured. The results are shown in Table 1.

Reference Example 1

The zirconia powder of Example 1 was molded at a mold pressure of 0.5 t/cm² and then sintered under a condition of 2 hours at 1450° C. to obtain a sintered body of Reference Example 1.

The crystal phases of the sintered body of Reference Example 1 were identified. The three-point bending strength and the relative sintered density were measured.

The method for identifying the crystal phases, the method for measuring the three-point bending strength, and the method for determining the relative sintered density were the same as above. The results are shown in Table 1.

TABLE 1

| | | Yttria | Alumina | Colorant | | | | | | Monoclinic crystal phase | Tetragonal crystal phase | Cubic crystal phase | Average particle diameter | Specific surface area | Three-point bending strength | Relative sintered density | Color tone | | | Remarks |
|---|---|---|---|---|---|---|---|---|---|---|---|---|---|---|---|---|---|---|---|---|
| | | | | ZnO | Fe$_2$O$_3$ | CoO | Cr$_2$O$_3$ | MnO$_2$ | TiO$_2$ | | | | | | | | L* | a* | b* | |
| | | mol % | wt % | | | | | | | % | % | % | μm | m$^2$/g | MPa | % | | | | |
| Example 1 | Powder | 3 | 0.25 | — | — | — | — | — | — | 34.5 | 65.5 | 0 | 0.51 | 13 | — | — | — | — | — | — |
| | Sintered body | | | | | | | | | 1.7 | 92.8 | 5.5 | — | — | 1400 | 99.7 | — | — | — | — |
| Example 2 | Powder | 3 | 0.25 | — | — | — | — | — | — | 31.8 | 68.2 | 0 | 0.72 | 7 | — | — | — | — | — | — |
| | Sintered body | | | | | | | | | 1.2 | 83.4 | 15.4 | — | — | 1410 | 99.7 | — | — | — | — |
| Example 3 | Powder | 3 | 0.25 | — | — | — | — | — | — | 29.7 | 70.3 | 0 | 0.66 | 8 | — | — | — | — | — | — |
| | Sintered body | | | | | | | | | 3.0 | 87.9 | 9.1 | — | — | 1380 | 99.6 | — | — | — | — |
| Example 4 | Powder | 3 | 0.1 | — | — | — | — | — | — | 29.0 | 71.0 | 0 | 0.48 | 12 | — | — | — | — | — | — |
| | Sintered body | | | | | | | | | 2.9 | 90.6 | 6.5 | — | — | 1365 | 99.6 | — | — | — | — |
| Example 5 | Powder | 2.6 | 0.25 | — | 0.7 | 1.2 | 1.3 | — | 0.7 | 38.6 | 61.4 | 0 | 0.63 | 7.3 | — | — | — | — | — | — |
| | Sintered body | | | | | | | | | 2.8 | 92.1 | 5.1 | — | — | 1390 | 99.8 | 5.7 | −0.5 | −1 | Black |
| Example 6 | Powder | 2.6 | 0.7 | — | — | 1.2 | 1.3 | 1.1 | — | 38.9 | 61.1 | 0 | 0.61 | 7 | — | — | — | — | — | — |
| | Sintered body | | | | | | | | | 2.7 | 92.1 | 5.2 | — | — | 1395 | 99.8 | 9 | −1.5 | −1 | Black |
| Example 7 | Powder | 2.6 | 0.25 | — | — | — | — | — | — | 37.8 | 62.1 | 0 | 0.6 | 7.5 | — | — | — | — | — | — |
| | Sintered body | | | | | | | | | 2.7 | 52.2 | 5.1 | — | — | 1400 | 99.7 | 88 | −0.6 | 1.7 | White |
| Example 8 | Powder | 3.2 | 0.1 | — | — | — | 0.05 | — | — | 30.8 | 69.2 | 0 | 0.49 | 8.5 | — | — | — | — | — | — |
| | Sintered body | | | | | | | | | 1.2 | 82.7 | 16.1 | — | — | 1300 | 99.8 | 41.1 | 3.4 | 10.8 | Gray |
| Example 9 | Powder | 3.2 | Less than 0.005 | — | — | — | — | 0.045 | — | 30.9 | 69.1 | 0 | 0.5 | 13.5 | — | — | — | — | — | — |
| | Sintered body | | | | | | | | | 1.4 | 64.1 | 14.5 | — | — | 1310 | 99.6 | 16 | 5 | −0.3 | Gray |
| Example 10 | Powder | 3.2 | 0.1 | — | — | — | — | 0.035 | — | 30.2 | 69.8 | 0 | 0.52 | 8 | — | — | — | — | — | — |
| | Sintered body | | | | | | | | | 1.1 | 83.6 | 15.3 | — | — | 1335 | 99.7 | 39 | 4 | −1 | Gray |
| Example 11 | Powder | 3.2 | 0.1 | — | — | — | — | 0.32 | — | 29.7 | 70.3 | 0 | 0.54 | 7.9 | — | — | — | — | — | — |
| | Sintered body | | | | | | | | | 1.3 | 83.9 | 14.8 | — | — | 1335 | 99.7 | 12.3 | 3.07 | −2.1 | Black |
| Example 12 | Powder | 3.2 | 0.25 | — | 0.18 | — | — | — | — | 27.9 | 72.1 | 0 | 0.52 | 13.5 | — | — | — | — | — | — |
| | Sintered body | | | | | | | | | 1 | 81.9 | 17.1 | — | — | 1330 | 99.7 | 65 | 5.7 | 28 | Brown |
| Example 13 | Powder | 3.2 | 0.1 | — | 0.18 | — | — | — | — | 30.1 | 69.9 | 0 | 0.51 | 7.9 | — | — | — | — | — | — |
| | Sintered body | | | | | | | | | 1.1 | 83.2 | 15.7 | — | — | 1325 | 99.7 | 64 | 5.5 | 28 | Brown |
| Example 14 | Powder | 3.2 | Less than 0.005 | — | 0.18 | — | — | — | — | 30.7 | 69.3 | 0 | 0.5 | 13 | — | — | — | — | — | — |
| | Sintered body | | | | | | | | | 1.5 | 83.9 | 14.6 | — | — | 1315 | 99.6 | 51 | 10.5 | 29 | Brown |
| Example 15 | Powder | 3.2 | 0.25 | — | 0.3 | — | — | — | — | 28.4 | 71.6 | 0 | 0.5 | 8.4 | — | — | — | — | — | — |
| | Sintered body | | | | | | | | | 1.4 | 82.7 | 15.9 | — | — | 1320 | 99.7 | 54 | 9.4 | 31 | Brown |

TABLE 1-continued

| | | Yttria | Alumina | Colorant | | | | | | Monoclinic crystal phase | Tetragonal crystal phase | Cubic crystal phase | Average particle diameter | Specific surface area | Three-point bending strength | Relative sintered density | Color tone | | | Remarks |
|---|---|---|---|---|---|---|---|---|---|---|---|---|---|---|---|---|---|---|---|---|
| | | | | ZnO | $Fe_2O_3$ | CoO | $Cr_2O_3$ | $MnO_2$ | $TiO_2$ | | | | | | | | L* | a* | b* | |
| | | mol % | wt % | | | | | | | % | % | % | μm | m²/g | MPa | % | | | | |
| Example 16 | Powder | 2.6 | 1.85 | — | — | 0.6 | — | — | — | 34.1 | 65.9 | 0 | 0.6 | 7.8 | — | — | — | — | — | — |
| | Sintered body | | | | | | | | | 3.2 | 92.3 | 4.5 | — | — | 1300 | 99.7 | 33 | −1.4 | −39 | Blue |
| Comparative Example 1 | Powder | 3 | 0.25 | — | — | — | — | — | — | 41.9 | 58.1 | 0 | 0.65 | 9 | — | — | — | — | — | — |
| | Sintered body | | | | | | | | | 7.3 | 77.1 | 15.6 | — | — | 1290 | 99.5 | — | — | — | — |
| Comparative Example 2 | Powder | 3 | 0.25 | — | — | — | — | — | — | 18.7 | 81.3 | 0 | 0.53 | 8 | — | — | — | — | — | — |
| | Sintered body | | | | | | | | | 2.5 | 95.5 | 1.6 | — | — | 1285 | 99.6 | — | — | — | — |
| Comparative Example 3 | Powder | 3 | 0.25 | — | — | — | — | — | — | 43.4 | 56.6 | 0 | 0.59 | 11 | — | — | — | — | — | — |
| | Sintered body | | | | | | | | | 13.4 | 78.2 | 10.4 | — | — | 1250 | 99.4 | — | — | — | — |
| Comparative Example 4 | Powder | 3 | 0.1 | — | — | — | — | — | — | 22.3 | 77.7 | 0 | 0.53 | 10 | — | — | — | — | — | — |
| | Sintered body | | | | | | | | | 3.8 | 94.0 | 2.2 | — | — | 1285 | 99.5 | — | — | — | — |
| Reference Example 1 | Sintered body | 3 | 0.25 | — | — | — | — | — | — | 0.8 | 93.4 | 5.8 | — | — | 1100 | 99.1 | — | — | — | — |

The invention claimed is:

1. A zirconia powder comprising 2.5 mol % or more and 3.5 mol % or less of yttria,
   wherein:
   an average particle diameter of the zirconia powder is 0.3 μm to 0.8 μm, the zirconia powder has a specific surface area of 5 m$^2$/g or more and 20 m$^2$/g or less, and includes crystal phases that have a monoclinic crystal phase ratio of 20% or more and 40% or less and a tetragonal crystal phase ratio of 60% or more and 80% or less; and
   when the zirconia powder is molded at a mold pressure of 0.8 t/cm$^2$ and then sintered under a condition of 2 hours at 1450° C. to obtain a sintered body, the sintered body includes crystal phases that have a monoclinic crystal phase ratio of 1% or more and 3% or less, a tetragonal crystal phase ratio of 77% or more and 94% or less, and a cubic crystal phase ratio of 5% or more and 20% or less.

2. The zirconia powder according to claim 1, wherein when the zirconia powder is molded at a mold pressure of 0.8 t/cm$^2$ and then sintered under a condition of 2 hours at 1450° C. to obtain a sintered body, the sintered body has three-point bending strength of 1200 MPa or more.

3. The zirconia powder according to claim 1, wherein when the zirconia powder is molded at a mold pressure of 0.8 t/cm$^2$ and then sintered under a condition of 2 hours at 1450°° C. to obtain a sintered body, the sintered body has three-point bending strength of 1300 MPa or more.

4. The zirconia powder according to claim 1, wherein when the zirconia powder is molded at a mold pressure of 0.8 t/cm$^2$ and then sintered under a condition of 2 hours at 1450°° C. to obtain a sintered body, the sintered body has three-point bending strength of 1400 MPa or more.

5. The zirconia powder according to claim 1, wherein the zirconia powder comprises one or more selected from the group consisting of Fe, V, Er, Mn, Co, Cr, Tb, Zn, and Ti.

6. The zirconia powder according to claim 1, wherein the zirconia powder comprises 0.4 to 1.0 mass % of $Fe_2O_3$, 0.9 to 1.5 mass % of CoO, 1.0 to 1.6 mass % of $Cr_2O_3$, and 0.5 to 0.9 mass % of $TiO_2$ as a colorant.

7. The zirconia powder according to claim 1, wherein the zirconia powder comprises 0.9 to 1.5 mass % of CoO, 1.0 to 1.6 mass % of $Cr_2O_3$, and 0.8 to 1.4 mass % of $MnO_2$ as a colorant.

8. The zirconia powder according to claim 1, wherein the zirconia powder comprises 0.15 to 0.35 mass % of ZnO as a colorant.

9. The zirconia powder according to claim 1, wherein the zirconia powder comprises 0.02 to 0.1 mass % of $Cr_2O_3$ as a colorant.

10. The zirconia powder according to claim 1, wherein the zirconia powder has an alumina content of less than 0.005 mass %, and comprises 0.03 to 0.06 mass % of $MnO_2$ as a colorant.

11. The zirconia powder according to claim 1, wherein the zirconia powder has an alumina content of 0.005 mass % or more and 2 mass % or less, and comprises 0.02 to 0.05 mass % of $MnO_2$ as a colorant.

12. The zirconia powder according to claim 1, wherein the zirconia powder has an alumina content of 0.005 mass % or more and 2 mass % or less, and comprises 0.2 to 0.5 mass % of $MnO_2$ as a colorant.

13. The zirconia powder according to claim 1, wherein the zirconia powder has an alumina content of 0.005 mass % or more and 2 mass % or less, and comprises 0.12 to 0.40 mass % of $Fe_2O_3$ as a colorant.

14. The zirconia powder according to claim 1, wherein the zirconia powder has an alumina content of less than 0.005 mass %, and comprises 0.12 to 0.23 mass % of $Fe_2O_3$ as a colorant.

15. The zirconia powder according to claim 1, wherein the zirconia powder has an alumina content of 1 mass % or more and 3 mass % or less, and comprises 0.3 to 1.0 mass % of CoO as a colorant.

16. A method for producing a zirconia powder according to claim 1, the method comprising:
    a step A of mixing basic zirconium sulfate with an yttria sol solution to obtain a mixed solution; and
    a step B of mixing the mixed solution with a base after the step A.

17. A method for producing a zirconia sintered body, the method comprising:
    a step X of molding a zirconia powder according to claim 1 at a mold pressure of 0.7 t/cm$^2$ or more and 0.9 t/cm$^2$ or less to obtain a molded body; and
    a step Y of sintering the molded body under a condition of 1 hour or more and 5 hours or less at 1300° C. or higher and 1500° C. or lower after the step X.

18. The method for producing a zirconia sintered body according to claim 17, wherein the obtained zirconia sintered body has three-point bending strength of 1200 MPa or more.

19. The zirconia powder according to claim 1, wherein the zirconia powder has the specific surface area of 5 m$^2$/g or more and 15 m$^2$/g or less.

20. The zirconia powder according to claim 1, wherein the zirconia powder includes the crystal phases that have the monoclinic crystal phase ratio of 20% or more and 35% or less and the tetragonal crystal phase ratio of 60% or more and 80% or less.

21. The zirconia powder according to claim 1, wherein the zirconia powder includes the crystal phases that have the monoclinic crystal phase ratio of 20% or more and 40% or less and the tetragonal crystal phase ratio of 65% or more and 80% or less.

* * * * *